No. 716,830. Patented Dec. 23, 1902.
P. H. DEIS.
PUMP.
(Application filed July 3, 1902.)
(No Model.)

Witnesses
C. H. Walker
J. T. Walker

Inventor
P. H. Deis

UNITED STATES PATENT OFFICE.

PHILIP H. DEIS, OF WASHINGTON, DISTRICT OF COLUMBIA.

PUMP.

SPECIFICATION forming part of Letters Patent No. 716,830, dated December 23, 1902.

Application filed July 3, 1902. Serial No. 114,202. (No model.)

*To all whom it may concern:*

Be it known that I, PHILIP H. DEIS, a citizen of the United States, residing in Washington, in the District of Columbia, have invented certain new and useful Improvements in Pumps; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention consists in an improved form of pump of the nature of that described in my copending application, Serial No. 101,455, filed April 5, 1902.

My invention will be found fully illustrated in the accompanying drawings, wherein corresponding characters of reference indicate like parts, and wherein—

Figure 1:
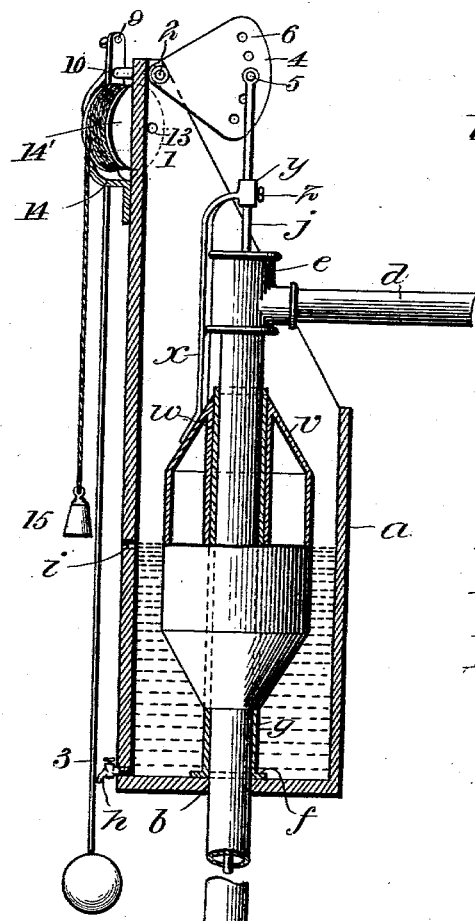
Figure 2:
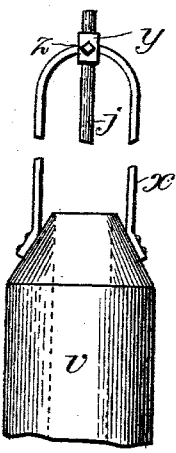
Figure 4:
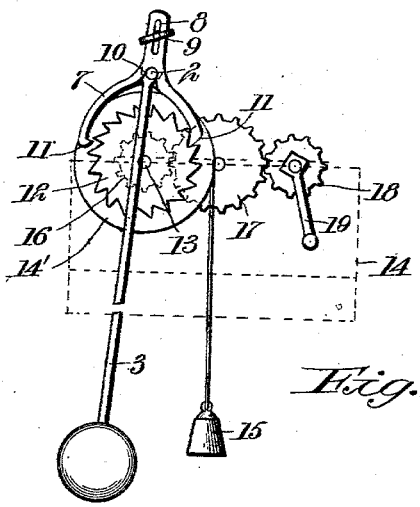
Figure 3:
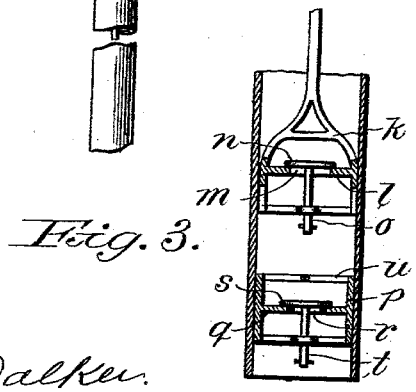

Figure 1 is a side view of my improved pump, a certain main chamber or receptacle portion thereof and certain other parts being shown in section. Fig. 2 is a front view of the upper portion of a certain float used as a portion of my apparatus. Fig. 3 is an enlarged detail view, in vertical section, of the main pipe through which the water is elevated, the piston or sucker, and the valve; and Fig. 4 is a view taken from the farther side of the pump as seen in Fig. 1 and showing in slightly-enlarged form the pump-motor.

In said drawings, $a$ is a tank or other receptacle of preferably cylindrical form which is adapted to receive a fluid, preferably water, which is adapted to act as one element of the motor. This tank or receptacle is open at the top and closed at the bottom, except for the opening $b$, through which the main pipe $c$ extends. Through the pipe $c$ the water is adapted to be elevated to be discharged from the pump through its pipe $d$, which is connected with the upper end of the pipe $c$ by an elbow $e$.

In the bottom of the tank or receptacle $a$ is secured the lower flanged end $f$ of a sleeve $g$. This sleeve extends up somewhat above the level which the water contained in said tank or receptacle is adapted to maintain, and, being securely fitted to the bottom of tank or receptacle about the opening $b$, it prevents the water flowing out from the chamber by way of the said opening.

$h$ is simply a cock located in the bottom of the tank or receptacle and adapted for draining the same.

$i$ is an overflow-duct for the tank or receptacle, the same being disposed at the extreme upper level to which the water in the tank is intended to attain.

$j$ is the sucker-rod or spear, the same being formed with a guiding-stirrup $k$ at its lower end, having a disk-like portion $l$, which is provided with an opening $m$ and on which is adapted to seat over said opening a disk valve $n$, whose stem $o$ is guided in the lower portion of the stirrup. The upper portion of the stirrup forms a stop for the valve $n$. In the pipe $c$ with said spear and the piston or sucker which it carries, and which piston or sucker comprises the parts last above referred to, and below said piston or sucker is arranged a cylinder $p$, having a diaphragm $q$, whose opening $r$ is controlled by a valve $s$, adapted to seat on the top of said diaphragm, and whose stem $t$ is guided in a portion of said cylinder. The cross-piece $u$, forming another portion of said cylinder, acts as a stop for the valve $s$.

The sleeve $g$ serves as a guide for a tightly-sealed buoyant chamber or float $v$, which in cross-section is substantially annular in form, its inner wall $w$ fitting snugly about the sleeve $g$, though not so tightly but that the float moves freely in a vertical direction. It is preferable that the upper and lower ends of this float be tapered, as shown in Fig. 1, so that the minimum resistance will be offered to it when it is moved vertically in the body of water maintained in the tank $a$. This float carries a bracket $x$, of arch-shaped form, which is preferably riveted thereto, said bracket having a head $y$, through which the upper end of the sucker-rod or spear $j$ projects, being there adjustably secured by a set-screw $z$.

In view of the foregoing description it will be seen that upon depressing the sucker-rod, thereby causing its sucker or piston to take above it in an obvious manner the water which is to be lifted, the body of water in the chamber $a$ will tend to displace the float $v$ and in doing so raise said float, the float in turn acting through the bracket $x$ to elevate the sucker-rod and the water which its piston has taken up.

In order to keep the pump in action automatically, I employ the following mechanism: The tank or receptacle is formed with an extension 1, constituting a support for an arbor or rock-shaft 2, to which is rigidly secured the upper end of a pendulum 3 and a segment 4. The segment practically forms a crank on the rock-shaft, and to it is connected the upper end of the spear $j$ by means of a pivotal pin 5. The segment is provided with an arc-shaped series of holes 6, any one of which may receive the pivoting-pin 5, so as to thus make possible an adjustment between the spear and the pendulum. Once the pendulum is started swinging the float and the pendulum will coact to keep the pump operating for a considerable length of time, the one reinforcing and balancing the action of the other, so that the operation is kept regular and easy. The upper end of the pendulum carries a double-palleted pawl 7, forming the oscillatory member of an anchor escapement-movement. This pawl has in its body portion a slot 8, which receives a threaded pin 9, on which is a thumb-screw, and it also has in its body portion a recess 10, which receives the end of the shaft or arbor 2. The pallets 11 of the pawl are adapted to engage alternately in a well-known manner as the pendulum swings the teeth of a ratchet-wheel 12. This ratchet-wheel is fixed on a shaft 13, which is journaled in a bracket 14, which may project from the part 1 of the tank $a$. The shaft 13 carries a drum 14', on which is wound a rope, cable, or the like, sustaining at its free end a weight 15. The weight is adapted through the rope, drum, and shaft 13 to turn the ratchet, whose effect is to oscillate the pawl 7, and consequently give impulses to the pendulum. In order to reset the mechanism when the weight has dropped to the full extent of the rope, a train of gearing 16, 17, and 18 may be connected to the shaft 13 and actuated by a crank 19 on one of the gears. To permit this resetting, it is only necessary to release the thumb-screw, whereupon the pawl can be moved temporarily up out of engagement with the ratchet.

I do not wish to be limited to the particular form of mechanical means herein described for imparting the impulses to the pendulum; but What I do claim as new, and desire to secure by Letters Patent, is—

1. In a pump, the combination, with the main conducting-pipe for the liquid to be elevated and with reciprocating liquid-elevating means in said pipe, of means, acting in opposite directions and disposed outside of said pipe, for maintaining said elevating means normally in a given position, a pendulum operatively connected to said liquid-elevating means, an escapement-movement controlling said pendulum, and means for actuating said escapement-movement, substantially as described.

2. In a pump, the combination, with the main conducting-pipe for the liquid to be elevated and with reciprocating liquid-elevating means in said pipe, of a fluid-containing receptacle, a buoyant body normally sustained elevated by the fluid in said receptacle, a pendulum, said liquid-elevating means and the buoyant body being operatively connected together, an escapement-movement controlling said pendulum, and means for actuating said escapement-movement, substantially as described.

3. In a pump, the combination, with the main conducting-pipe for the liquid to be elevated and with reciprocating liquid-elevating means in said pipe, of a fluid-containing receptacle, a buoyant body normally sustained elevated by the fluid in said receptacle, a pendulum, said liquid-elevating means and the buoyant body being operatively connected together, an escapement-movement controlling said pendulum, and gravity-actuated means controlling said escapement-movement, substantially as described.

4. In a pump, the combination, with the main conducting-pipe for the liquid to be elevated and with reciprocating liquid-elevating means in said pipe, of means, acting in opposite directions and disposed outside of said pipe, for maintaining said elevating means normally in a given position, a pendulum operatively connected to said liquid-elevating means, a weight, and operative power-transmitting mechanism between the weight and the pendulum, substantially as described.

In testimony that I claim the foregoing I have hereunto set my hand this 3d day of July, 1902.

PHILIP H. DEIS.

Witnesses:
JAMES W. BEVANS,
CLARENCE N. WALKER.